United States Patent
Cowiesen et al.

(10) Patent No.: US 11,819,040 B2
(45) Date of Patent: Nov. 21, 2023

(54) MATERIALS AND METHODS FOR DIETARY CALCIUM SUPPLEMENTATION OF ANIMALS

(71) Applicant: DSM IP ASSETS B.V., Heerlen (NL)

(72) Inventors: Aaron Cowiesen, Kaiseraugst (CH); Jose-Otavio Sorbara, Kaiseraugst (CH)

(73) Assignee: DSM IP ASSETS B.V., Heerlen (NL)

( * ) Notice: Subject to any disclaimer, the term of this patent is extended or adjusted under 35 U.S.C. 154(b) by 345 days.

(21) Appl. No.: 16/955,621

(22) PCT Filed: Dec. 19, 2018

(86) PCT No.: PCT/US2018/066388
§ 371 (c)(1),
(2) Date: Jun. 18, 2020

(87) PCT Pub. No.: WO2019/126262
PCT Pub. Date: Jun. 27, 2019

(65) Prior Publication Data
US 2021/0051981 A1 Feb. 25, 2021

Related U.S. Application Data

(60) Provisional application No. 62/608,049, filed on Dec. 20, 2017.

(51) Int. Cl.
*A23K 20/24* (2016.01)
*A23K 50/75* (2016.01)

(52) U.S. Cl.
CPC .............. *A23K 20/24* (2016.05); *A23K 50/75* (2016.05)

(58) Field of Classification Search
CPC ................................ A23K 20/24; A23K 50/75
USPC .......................................................... 426/2
See application file for complete search history.

(56) References Cited

U.S. PATENT DOCUMENTS

| | | | |
|---|---|---|---|
| 3,319,606 A | 5/1967 | Virgil | |
| 3,523,798 A | 8/1970 | Kail | |
| 3,962,484 A | 8/1976 | Grosso et al. | |
| 4,867,977 A | 9/1989 | Gailly et al. | |
| 5,232,709 A | 8/1993 | Saltman et al. | |
| 2010/0136118 A1 | 6/2010 | Matano et al. | |
| 2014/0161955 A1 | 6/2014 | Wadhwa | |
| 2014/0287088 A1 | 9/2014 | Henry | |

OTHER PUBLICATIONS

W36—Hy-Line North America, https://hylinena.com/w36/ (accessed on Nov. 30, 2022) (Year: 2022).*
Damron, B.L. et al., "Calcium Supplementation of Hen Drinking Water", Poultry Science, May 1, 1995, pp. 784-787, vol. 74, No. 5.
Weaver, Connie M. et al., "Absorption of calcium fumarate salts is equivalent to other calcium salts when measured in the rat model", Journal of Agricultural and Food Chemistry, Aug. 14, 2002, pp. 4974-4975, vol. 50, No. 17.
International Search Report of International Patent Application No. PCT/US2018/066388 dated May 1, 2019.
H. V. Masey O'Neill et al, "Effect of Xylanase on Performance and Apparent Metabolisable Energy in Starter Broilers Fed Diets Containing One Maize Variety Harvested in Different Regions of China", Asian-Australasian Journal of Animal Sciences., KR, vol. 25, No. 4, ISSN 1011-2367, pp. 515-523. DOI: http://dx.doi.org/10.5713/ajas.2011.11314.
F. Zaefarian et al, "Influence of a microbial phytase on the performance and the utilisation of energy, crude protein and fatty acids of young broilers fed on phosphorus-adequate maize- and wheat-based diets", British Poultry Science., GB, vol. 54, No. 5, ISSN 0007-1668, pp. 653-660. DOI: http://dx.doi.org/10.1080/00071668.2013.830209.
Jalil Mahmwd Abdulla et al, "Feeding value of field beans (*Vicia faba* L. var. minor) with and without enzyme containing tannase, pectinase and xylanase activities for broilers", Archives of Animal Nutrition, US, vol. 71, No. 2, ISSN 1745-039X, pp. 150-164. DOI: http://dx.doi.org/10.1080/1745039X.2017.1283823.

* cited by examiner

*Primary Examiner* — Yih-Horng Shiao
(74) *Attorney, Agent, or Firm* — MCBEE MOORE & VANIK IP LLC

(57) ABSTRACT

Methods for providing dietary calcium to livestock and other animals and the compositions for use in providing dietary calcium to livestock are disclosed. Kits to provide the animal with a desired amount of supplemental calcium during normal watering is also disclosed.

25 Claims, 2 Drawing Sheets

Arrangement of water tanks (with or without supplemented Ca) for bird cages

MATERIALS AND METHODS FOR DIETARY CALCIUM SUPPLEMENTATION OF ANIMALS

CROSS-REFERENCE TO RELATED APPLICATIONS

This application is a National Stage entry of International Application No. PCT/US2018/066388, filed 19 Dec. 2018, which claims priority to U.S. Provisional Application No. 62/608,049, filed 20 Dec. 2017.

BACKGROUND

Field

This Application claims priority to and incorporates by reference U.S. Provisional Application No. 62/608,049, filed Dec. 20, 2017, in its entirety.

FIELD OF THE INVENTION

The present invention relates to methods for providing dietary calcium to animals, such as livestock animals, compositions for use in providing dietary calcium to animals, and kits to provide the animal with a desired amount of supplemental calcium during normal watering.

Description of Related Art

Calcium is a key macro-mineral for poultry, swine and aqua and it is involved in several key metabolic processes, especially involving skeletal development. However, the raw materials used in the formulation of diets for most monogastric animals, such as pig, chicken, horse, rabbit; e.g. corn, wheat and soybean meal, often contain low calcium concentrations that are unable to meet the requirement of the animal. To overcome this shortfall many diets are supplemented with calcium carbonate (limestone) to raise the dietary concentration of calcium from around 1-2 g/kg to 7-40 g/kg depending on the age, species and reproductive stage of the animal in question. While this strategy is effective in achieving an appropriate calcium concentration in the diet, adding limestone in this way can cause a range of secondary problems, including those related to impaired digestibility and solubility of phosphorus and protein/amino acids.

Some animal species (such as poultry) have evolved the capacity to regulate nutrient intake when presented with a range of potential foods in various ecological niches and this includes expression of a specific appetite for calcium (Wilkinson S J, Selle P H, Bedford M R, Cowieson A J (2011), Exploiting calcium-specific appetite in poultry nutrition, Worlds Poultry Science Journal 67, 587-598). Various studies have demonstrated that poultry, for example, can regulate calcium intake when presented with a diet that is adequate in nutrients other than calcium and a spatially separate source of calcium such as limestone grit (Wilkinson S J, Selle P H, Bedford M R, Cowieson A J (2013), Separate feeding of calcium improves performance and nutrient digestibility in broiler chicks, Animal Production Science). However, the capacity to separately regulate the intake of calcium and the remainder of the diet relies on distinct provision of separate sources. Simply mixing limestone grit into a pelleted diet (moderate spatial separation) is often ineffective. Furthermore, there is variability in the expression of calcium-specific appetite in individual animals within a population and this can lead to variable performance and poor uniformity (Wilkinson S J, Selle P H, Bedford M R, Cowieson A J (2011), Exploiting calcium-specific appetite in poultry nutrition, Worlds Poultry Science Journal 67, 587-598 and Wilkinson S J, Selle P H, Bedford M R, Cowieson A J (2013), Separate feeding of calcium improves performance and ileal nutrient digestibility in broiler chicks, Animal Production Science). The commercial application of separate calcium feeding is also likely to be problematic logistically as this involves provision of a separate feeding line for calcium carbonate grit in poultry houses and separate storage and delivery of limestone etc.

Alternate methods of providing dietary calcium to livestock are lacking. Therefore, there is a need to provide improved methods and products for supplemental calcium in animals, such as cows, pigs, poultry, sheep, goats. turkeys, horse, oxen, racing animals, ducks, dogs, fish, birds, and cats etc. preferably the animals are monogastric animals, such as poultry, pig, horse, rabbit, dog, and cat.

SUMMARY

Methods for providing dietary calcium to livestock, such as poultry, pig, etc. are disclosed, comprising feeding to a livestock animal an aqueous drinking composition comprising a water-soluble calcium salt, wherein the concentration of the water-soluble calcium salt is sufficient to provide the animal with a desired amount of supplemental calcium during normal watering.

Compositions for use in providing dietary calcium to livestock are disclosed, comprising an amount of a water-soluble calcium salt, wherein the amount of the water-soluble calcium salt is sufficient to provide an aqueous drinking composition having a concentration of calcium ion sufficient to provide the animal with a desired amount of supplemental calcium during normal watering.

Kits are further disclosed, comprising a water-soluble or water-miscible composition of a water-soluble calcium salt and instructions for using the water-soluble or water-miscible composition to generate an aqueous drinking composition having a concentration of calcium ion sufficient to provide the animal with a desired amount of supplemental calcium during normal watering.

Other embodiments and features are described in more detail herein, and will be apparent from the present disclosure.

DETAILED DESCRIPTION OF A PREFERRED EMBODIMENT

Figure 1:
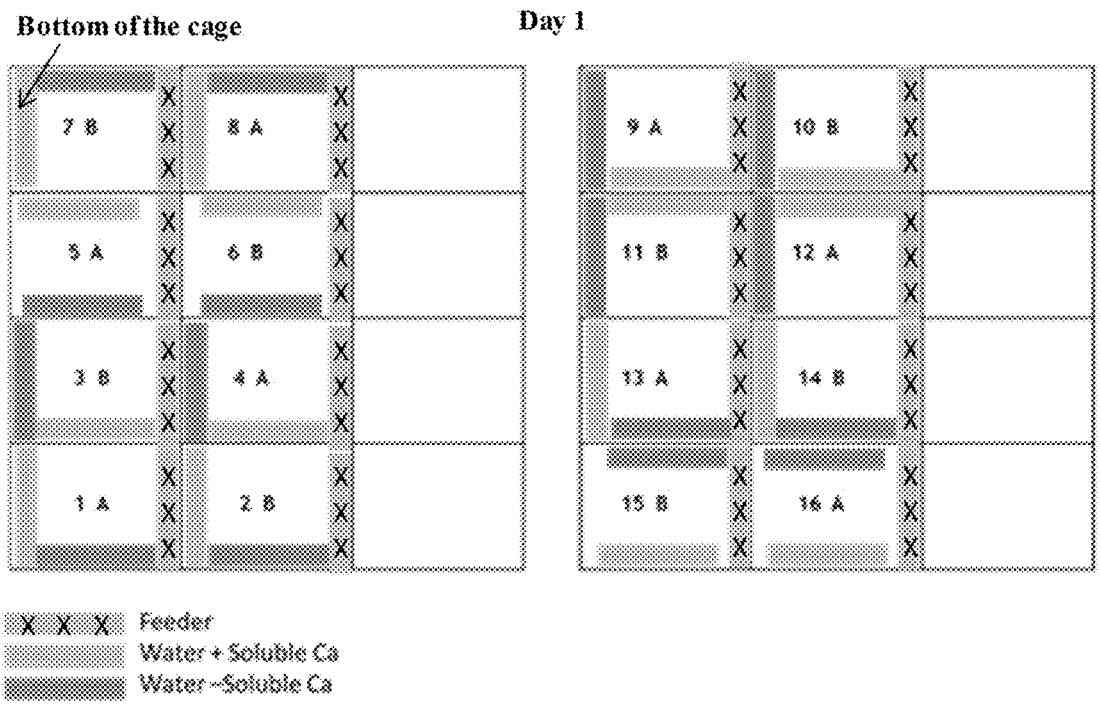
FIG. 1 depicts the arrangement of water tanks with or without supplemented calcium for bird cages as described in Example 1 below.
Figure 1:
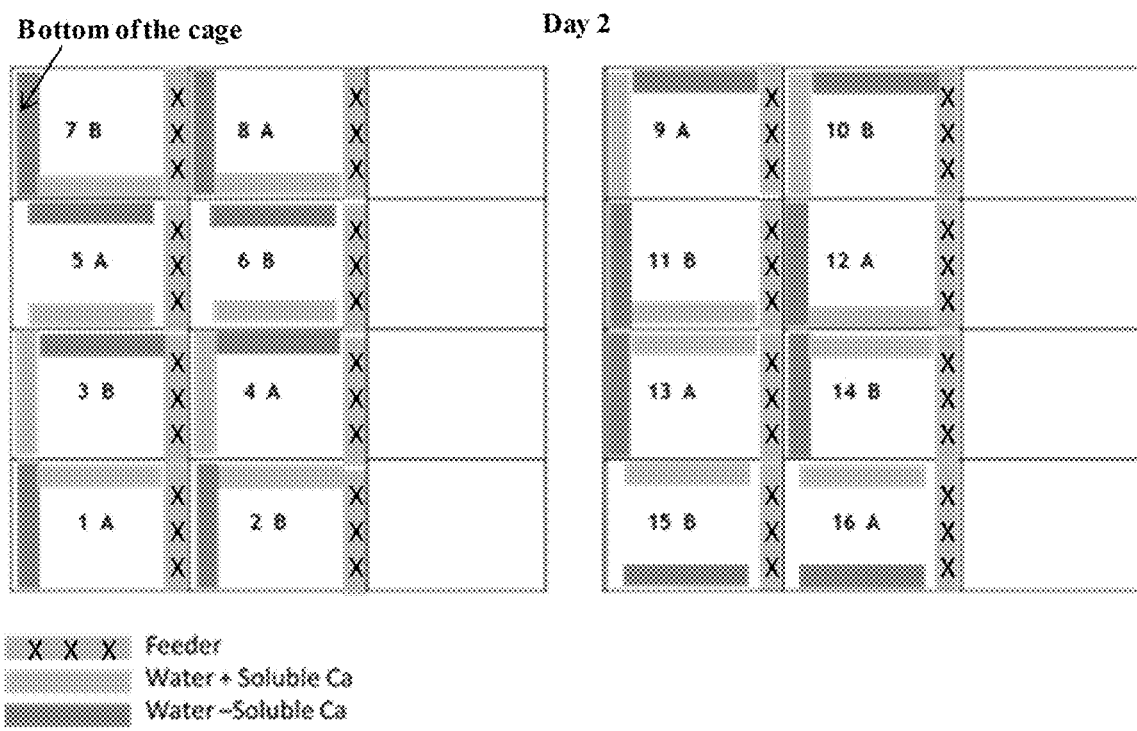

The present disclosure relates generally to provision of dietary calcium to animals, including monogastric livestock, via aqueous compositions of water-soluble calcium salts. The aqueous compositions of water-soluble calcium salts may be provided to the animal in lieu of (or as a supplement to) provision of calcium supplement feed or solid calcium compositions (such as solid calcium carbonate) to the animals. Additionally, the aqueous compositions of water-soluble calcium salts may be provided to the animal separate from the animal's feed. The use of the aqueous compositions of water-soluble calcium salts is beneficial as it renders adding solid calcium sources, such as limestone, to feed unnecessary. These aqueous compositions provide a number of advantages over exclusive supplementation with solid calcium compositions, such advantages including: improvement in digestibility and solubility of phosphorus and protein/amino acids from feed, improved performance and uniformity for calcium supplementation across a population of the animals, and simplified logistics compared to solid calcium supplementation.

I. ANIMALS

The presently disclosed methods, compositions, and kits may be used in calcium supplementation of any domestic animal needing calcium supplementation, including domesticated pets (such as dog, cat, etc.), working animals (such as horse, oxen, racing animals, etc.), livestock (cattle, sheep, goats, chicken, pig, etc.), etc. In an embodiment, the animals are livestock, including for example, ruminants (such as cattle, sheep, goats, and the like), monogastric livestock (such as fowl, swine, etc.), and fish. In a specific embodiment, the methods, compositions, and kits are for cows, pigs, poultry, sheep, goats. turkeys, horse, oxen, racing animals, ducks, dogs, fish, birds, and cats etc. Preferably methods, compositions, and kits are for monogastric animals, such as poultry, pig, horse, rabbit, dog, and cat. Even more preferably, the methods, compositions and kits are for monogastric livestock, such as livestock selected from the group consisting of poultry and pig.

II. AQUEOUS DRINKING COMPOSITIONS

The water-soluble calcium salt is provided to the animal in the form of an aqueous drinking composition. As used herein, the term "aqueous drinking composition" refers to any aqueous fluid suitable for consumption by the animal to which it is administered. The aqueous drinking compositions specifically refers to the composition at a final concentration of calcium ions which the animal directly consumes.

IIA. Constituents of the Aqueous Drinking Compositions

In an embodiment, the aqueous drinking composition is any aqueous solution suitable for drinking by the animal that has dissolved or mixed therein an exogenous water-soluble calcium salt, including inorganic salts and/or organic salts. In an embodiment, a water-soluble calcium salt is selected that is (1) safe for the animal to consume and (2) has a solubility in water sufficient to provide the desired concentration of calcium ions. Exemplary water-soluble calcium salts include, for example, calcium malate, calcium acetate, calcium carbonate, calcium fumarate, calcium gluconate, and combinations of two or three or more thereof.

The aqueous drinking composition may be provided as a mixture of the animal's normal drinking water (such as well water, irrigation water, tap water, and the like) and the water-soluble calcium salt. Also, a concentrate mixture of water and the calcium salts can be added to the animals' normal drinking water, or the calcium salt or salts can be added to the animals' normal drinking water to obtain he desired calcium concentration. The aqueous drinking composition may also include additional elements, such as flavorings, stabilizers to prevent precipitation of the calcium salt, pH adjusters, buffers. In an embodiment, the aqueous composition has a pH of 5-8 as measured at a temperature 25° C. In an embodiment, the aqueous drinking composition is made by mixing a water source with a dissolvable or water-miscible composition comprising the water-soluble calcium salt and the optional additional components. For example, the water-soluble calcium salt (and the other optional components) may be provided as water-soluble tablets, powders, lyophilates, and the like, which may be measured out and dissolved into the animal's drinking water. As another example, a concentrated "master mix" may be provided, wherein the water-soluble calcium salt (and the other optional components) are dissolved or suspended in a water-miscible solution as a concentrated, which may be diluted into the animal's normal drinking water at defined ratios in order to obtain the aqueous drinking composition. Other arrangements may be available as well.

In an embodiment, the dissolvable or water-miscible composition of a water-soluble calcium salt may be provided as a kit. In an embodiment, the kit may further include instructions for combining an amount of the dissolvable or water-miscible composition with a volume of an aqueous solution (such as the animal's normal drinking water) to obtain a volume of the aqueous drinking composition. In an embodiment, the instructions include directions for providing a volume of aqueous drinking composition having a concentration of the water-soluble calcium salt sufficient to provide the animal with a target amount of calcium when the animal consumes the volume of the aqueous drinking composition. The instructions can also include instructions not to add limestone to feed and instructions on how to feed and water animals.

In an embodiment, the target amount of calcium is at least 15%, 25%, at least 50%, at least 75%, at least 80%, at least 85%, at least 90%, at least 95%, at least 99%, or at least 100% of a total daily amount of calcium recommended for the animal. In an embodiment, the kit may contain further components that aid in production of the aqueous drinking composition, such as, for example, devices for measuring the dissolvable or water-miscible compositions (such as measuring spoons or cups, graduated cylinders, scales, and the like), components for measuring physical properties of the aqueous drinking composition, such as pH and/or calcium concentration.

In another embodiment, an article of manufacture may be provided, the article of manufacture comprising a drinking apparatus having disposed therein a pre-measured volume of aqueous drinking composition or a dissolvable or water-miscible composition as described herein. In an embodiment, the article of manufacture may be a drink bottle or other container filled with a volume of the aqueous drinking composition sufficient to provide a pre-defined number of animals with a pre-determined percentage of a recommended amount of dietary calcium. In another embodiment, the article of manufacture comprises an amount of the dissolvable or water-miscible composition sufficient to provide a pre-defined number of animals with a pre-determined percentage of a recommended amount of dietary calcium. In this embodiment, the drinking apparatus may have a volume sufficient to hold a pre-determined volume of normal drinking water, and may optionally comprise fill lines or other markings indicating how much of the drinking water to add to the apparatus to obtain the aqueous drinking composition.

IIB. Concentrations of Water-Soluble Calcium Salt in the Aqueous Drinking Composition In an embodiment, the aqueous drinking composition has a concentration of water soluble calcium salt selected such that an individual animal consumes a desired percentage of a total amount of dietary calcium recommended for the animal by drinking a defined volume of the aqueous drinking composition.

In an embodiment, the target amount of dietary calcium provided to the animal is greater than or equal to 25% of the dietary calcium recommended for that animal from a recognized organization (for example, as recommended by the United States Department of Agriculture). Other exemplary target amounts include, for example, greater than or equal to 15%, greater or equal to 50%, greater than or equal to 75%, greater than or equal to 80%, greater than or equal to 85%, greater than or equal to 90%, greater than or equal to 95%, greater than or equal to 99%, or greater than or equal to 100%.

In an embodiment, the target amount of the calcium is selected in order to compensate for a calcium deficiency of the animal and/or to avoid the need to add calcium sources, such as limestone to the feed. A "calcium deficiency" as used herein is a difference between a minimum recommended daily amount of calcium for the animal and an average daily calcium intact for the animal from all dietary sources of calcium, including the animal's feed, solid calcium supplement, and non-supplemented water. Thus, for example, the user may estimate or calculate the total amount of calcium typically obtained via the animal's feed, optionally also including the calcium provided by the animal's normal drinking water and/or additional solid calcium supplementation (such as by mixing dry limestone grit with the animal's feed or provided dry limestone separately). The user may then compare the estimated daily amount of calcium consumed by the animal to a daily amount of calcium recommended for the animal (such as an amount recommended by a recognized organization) and determine how much additional calcium is needed to be consumed by the animal in order to meet the daily amount of calcium recommended for the animal. The water-soluble calcium salt may then be added to the animal's normal drinking water (or any other another potable water source available to the animal) in an amount sufficient to supply the additional amount of calcium to the animal during the animal's normal consumption of water.

The defined volume of aqueous drinking composition may be any volume up to and including the total volume of water intended to be consumed by an individual animal or a group of animals. Note that the "defined volume" is not a measure of how much aqueous drinking composition is actually consumed by the animal. Rather, it is a metric used to determine the concentration of water-soluble calcium salt to be included in the aqueous drinking composition in order to provide the animal with sufficient calcium. In an embodiment, the defined volume is a volume not more than the recommended daily water consumption for the animal. In an embodiment, the recommended daily water consumption may be a minimum daily water consumption recommended for the animal as published by a recognized organization (for example, as recommended by the United States Department of Agriculture).

In an embodiment, the defined volume is a volume less than or equal to a minimum daily water consumption recommended for the animal as published by an organization. The volume is less than or equal to such a volume in order to increase the likelihood that the animal actually consumes the desired amount of calcium. Thus, for example, the user may select a defined volume that is less than the recommended daily water consumption (for example, 15%, 25%, 50%, or 75% of the recommended daily water consumption) and select a concentration of the water-soluble calcium salt for the aqueous drinking composition that would provide the target amount of calcium to the animal if the animal were to consume the defined volume. In use, the user would provide at least the defined volume of aqueous drinking solution to the animal. Once the animal has consumed the defined volume of the aqueous drinking solution, the animal may then be provided with normal unsupplemented drinking water or may continue to be provided with the aqueous drinking solution. In a specific embodiment, the concentration of the water-soluble calcium salt may be selected such that an animal receives the target amount of calcium by consuming a volume of the aqueous drinking solution that is equal to the recommended daily water consumption. In any case, the user should provide to the animal, at a minimum, the defined volume of the aqueous drinking solution, and may also wish to provide excess aqueous drinking solution in order to compensate for evaporation, spillage, and other loss of fluid.

III. METHODS OF PROVIDING SUPPLEMENTAL DIETARY CALCIUM

The aqueous drinking compositions as described herein may be used as a part of a feeding and watering plan to provide the animal with supplemental dietary calcium.

In some embodiments, the aqueous drinking compositions are the sole source of supplemental dietary calcium. In such an embodiment, a volume of aqueous drinking composition is provided to the animal that delivers to the animal at least equal to a difference between daily amount of dietary calcium provided by feed consumed by the animal and a recommended daily amount of calcium for the animal.

In another embodiment, the aqueous drinking composition is provided to replace at least a portion of solid calcium supplement provided to the animal. Thus, for example, the user may select an amount of solid calcium supplement (such as dry limestone limestone grit) that is insufficient to provide the animal with a recommended daily amount of calcium. For example, a solid calcium supplement may be provided in an amount that minimizes problems associated with solid calcium supplementation (such as impaired digestibility and solubility of phosphorus and protein/amino acids or reduced feeding desire for the animal). A volume of aqueous drinking composition may then be selected that compensates for the difference between the calcium deficiency caused by reducing (or eliminating) the amount of solid calcium supplement. In some embodiments, an amount of feed and solid calcium supplementation is selected that provides 85% or less, 75% or less, 50% or less, 25% or less, 15% or less, 10% or less, or 5% or less of the recommended daily amount of dietary calcium to the animal, and wherein a volume of aqueous drinking composition is provided such that, when consumed, the sum of calcium provided by feed, solid calcium supplementation, and aqueous drinking composition is equal to 100% or greater of the daily amount of dietary calcium recommended for the animal.

In an embodiment, the animal's normal drinking water is completely replaced by the aqueous drinking composition. In another embodiment, the supplemental drinking water is the only calcium supplement since none is added to feed, allowing advantages of completely replacing the addition of limestone which causes gastric issues. Such an embodiment may be desirable when, for example, it is not possible or inconvenient for the user to monitor the volume of aqueous drinking composition that is consumed by each individual animal. In such an embodiment, the concentration of water-soluble calcium salt in the drinking composition should be selected such that each animal would consume the target amount of calcium by drinking a volume of aqueous drinking composition less than or equal to a recommended minimum daily water consumption for the animal. The actual volume of aqueous drinking composition provided to the animals may be in excess of the recommended minimum daily water consumption, for example, to compensate for loss of liquid due to evaporation, spillage, etc.

In another embodiment, the animal's consumption of the aqueous drinking composition may be in addition to provision of normal drinking water that is not supplemented with exogenous water-soluble calcium salt. Such an embodiment may be desirable when, for example, each animal has its own source of water, when individual water consumption can be monitored, and/or when it is desired to avoid over-consumption of calcium. In such an embodiment, the concentration of water-soluble calcium salt in the drinking composition is selected such that each animal would consume the target amount of calcium by drinking a volume of aqueous drinking composition less than a recommended minimum daily water consumption for the animal. Thus, for example, a percentage of the animal's daily recommended water intake is provided by the aqueous drinking composition, and the balance is provided by an unsupplemented water source. Thus, for example, the aqueous drinking composition may account for, for example, 5% or more, 10% or more, 15% or more, 20% or more, 25% or more, 30% or more, 40% or more, 50% or more, 60% or more, 75% or more, 85% or more, 90% or more, or 95% or more of the recommended minimum daily water consumption for the animal, and the balance of the minimum daily water consumption for the animal is provided by the unsupplemented drinking water source. The actual volume of water source (including the aqueous drinking composition and unsupplemented normal drinking water) provided to the animals may be in excess of the recommended minimum daily water consumption, for example, to compensate for loss of liquid due to evaporation, spillage, etc.

In an embodiment, the aqueous drinking composition is provided separate from the animals feed. As used herein, "provided separate" shall mean that the feed and the aqueous drinking composition are not in physical contact with one another before being consumed. Thus, in an embodiment, the aqueous drinking composition is separated spatially from the feed, for example, by being provided in a separate container from the feed. In another exemplary embodiment, the aqueous drinking composition is separated from the feed temporally, for example, by being provided to the animal at different times. Any combination of spatial and temporal separation of the feed and aqueous drinking composition is acceptable.

IV. EXAMPLES

Commercial poultry and swine consume approximately 2 kg of water for every 1 kg of feed consumed. This water is typically from municipal sources and contains low concentrations of minerals such as sodium and calcium and has a pH range of 5.5-7. However, in hard water areas the calcium concentration is elevated and so drinking water calcium concentration can range from around 10 mg/l to over 130 mg/l. In the case of a growing broiler chicken the requirement for calcium is around 9 g/kg of feed and assuming a consumption of 2 kg of water for each kg of feed this means that the maximum contribution of drinking water to calcium requirements is around 200-260 mg/kg of feed (compared with a requirement of 9000 mg/kg). So, even in 'hard water' areas where drinking water contains around 130 mg/l dissolved calcium this will contribute less than 3% of the bird's calcium requirement. In order to meet the full requirement of the bird the drinking water would need to contain around 3000-4000 mg/l calcium (assuming complete substitution of drinking water with calcium fortified drinking water).

Fortification of water with calcium according to the invention relies on the use of highly soluble calcium sources to avoid issues of precipitation. While calcium carbonate is poorly soluble in water (maximum soluble calcium being 0.56 mg/l—although particle size of the calcium carbonate will affect solubility as well as the pH of the drinking water) alternative organic salts of calcium such as calcium lactate malate, calcium gluconate and calcium lactate citrate have maximum soluble calcium concentrations of 20,820 mg/l, 2700 mg/l and 15,880 mg/l respectively (Kressel G., Wolters M., Hahn A. (2010), Bioavailability and Solubility of Different Calcium-Salts as a Basis for Calcium Enrichment of Beverages, Food and Nutrition Science, 1, 53-58). This means that organic calcium salts can be used as fortifying agents for drinking water of agricultural animals such as poultry and swine and are soluble enough to allow fortification to a level that would easily meet the requirement of the animal.

The invention fortifies drinking water with a water-soluble calcium salt in order to allow the animal to meet calcium intake targets without the need for inclusion of limestone in the dry feed. It is believed that this spatial separation of calcium from the feed will be adequate to increase the digestibility of the feed (especially for phosphorus and amino acids), improve animal performance and welfare without relying on complex feeding systems for dry limestone grit. Various organic salts of calcium may be used, such as, but not limited to, calcium malate, calcium acetate, calcium carbonate, calcium fumarate, calcium lactate, calcium citrate, and calcium gluconate (and various mixed salts of the same) may be useful. It is also expected that, in addition to improvements in the digestibility of phosphorus and amino acids per se this feeding regime may increase the efficacy of exogenous enzymes (including, but not limited to phytase, protease and arabinoxylanase) through improved substrate presentation and solubility and also increase flexibility in vitamin D strategies.

The exemplary target average calcium concentrations for a fortified water program for various animal types is the calcium concentration that completely replaces dry limestone grit supplementation, assuming that the animal consumes a volume of fortified water at least equal to the recommended daily water consumption for that animal. The target average $[Ca^{2+}]$ is equal to the Typical $Ca^{2+}$ deficit divided by the recommended daily water consumption.

Example 1

Experimental Design:

| Schedule: | Starting date | Day 8 |
|---|---|---|
| | End date | Day 17 |
| Animals: | Age and sex | 8 days old male broiler chickens |
| | Breed | Cobb 500 |
| | Number | 96 (16 pens × 6 birds) |
| Housing: | Room | 28/26 |
| | Distribution by treatment | 2 treatments with 8 replicates per treatment |
| | | 6 birds per pen = 48 birds/treatment |

-continued

| Feedstuff: | Ingredients | Diet 1: Corn/SBM (soy bean meal) adequate in calcium |
| --- | --- | --- |
| | | Diet 2: Corn/SBM low in calcium with |
| | Coccidiostat | |
| | Form: | Crumbed pelleted feed (d1-d7 period) Pelleted feed (d8-d17) |
| | Types and quantity of the diets: | Experimental feed: 50 kg/treatment |
| | Feed distribution | Ad libitum |
| | Water distribution | Ad libitum with and without soluble Ca (Ca fumarate anhydrous or Ca citrate malate) supplementation |

Animals and Housing

Day-old male broiler chickens (Cobb 500) were supplied by a commercial hatchery. The chickens were housed in wire-floored battery cages in an environmentally controlled room. The room temperature was adapted according to the requirements of the chickens. Feed and water were provided ad libitum. Chickens were fed with adequate phosphorus basal diet until day 8. On day 8, they were divided by weight into groups, each comprising 6 birds, and were allocated to one of the different treatments. Each treatment was replicated with eight groups. On day 8, the experimental diets were distributed.

Experimental diets and tap water were provided for ad libitum consumption.

Feeding and Treatments

The experimental diets (diet 1 and diet 2) as set forth below in Table 1 were based on SBM and Corn as main ingredients.

TABLE 1 diets composition:

| Ingredients (%) | Diet 1, adequate Ca | Diet 2, low calcium |
| --- | --- | --- |
| Soybean meal | 36.60 | 36.50 |
| Corn | 57.24 | 58.59 |
| Soya Oil | 2.40 | 2.00 |
| DL Methionine | 0.30 | 0.30 |
| L-Lysine | 0.20 | 0.20 |
| NaCl | 0.10 | 0.10 |
| Dicalcium Phosphate | 1.50 | 1.50 |
| Limestone | 0.85 | — |
| Premix V&M | 0.75 | 0.75 |
| Coccidiostat | 0.06 | 0.06 |
| Calculated Provision | | |
| AME, MJ/kg | 12.6 | 12.6 |
| AME, kcal/kg | 3010 | 3010 |
| Crude Protein, % | 21.5 | 21.5 |
| Dig. Met + Cys, % | 0.89 | 0.89 |
| Dig. Lys, % | 1.19 | 1.19 |
| Ca, % | 0.96 | 0.63 |
| P total, % | 0.63 | 0.63 |
| avP, % | 0.30 | 0.30 |

As seen from Table 1: diets composition, diet 1: 9.6 g/kg Ca
Diet 2: 6.3 g/kg Ca
[Diet 1-Diet 2] = 3.3 g/kg Ca → inclusion of Ca in water = 1.65 g/kg

TABLE 2

Amount of diet-based supplementation of Calcium in water

| | Diet description | Supplementation of Calcium in water (dosage) |
| --- | --- | --- |
| A | Diet 1 Adequate in calcium and P level | 0 |

TABLE 2-continued

Amount of diet-based supplementation of Calcium in water

| | Diet description | Supplementation of Calcium in water (dosage) |
| --- | --- | --- |
| B | Diet 2 Low in calcium and adequate in P level | 1.65 g/kg |

The birds in each cage had access to drinking water supplemented or not supplemented with soluble calcium from day 13 to day 17. As can be seen in FIG. 1, in each cage, two water tanks were at the disposal of birds and were randomly allocated. To avoid any habit the allocation of the water tank was changed every day.

The feed and water consumption were recorded each day for each cage.

Each day, after recording the water consumption, the water was remove and fresh water supplemented with or without soluble calcium was distributed.

Calcium in Water:

The products were dissolved in water and added to each water tank per cage per the calculations of Table 4. The solution was prepared freshly every day. The birds had access to the calcium dosing until the next day. The quantity of water consumed is estimated at 2 L for 1 kg feed.

TABLE 4

Calculations of amount of Ca fumarate anhydrous added to water

| | Product | Daily Calcium dose (mg/kg = mg/L) | Concentration of the product (%) | Quantity of product to add (g) |
| --- | --- | --- | --- | --- |
| B | Ca fumarate anhydrous | 1650 mg/kg | 23.0-29.9 | 7.0 | calcium water content = 122 mg/L

TABLE 5

Measurements taken:

| | | Performance |
| --- | --- | --- |
| Each cage | Weight of the feeder every day | Feed consumption |
| Each cage | Weight of the drinker every day Distribution of fresh dose of calcium every day | Water consumption |
| Day 13-17 | 8 replicates of 6 birds/treatment | Average feed and water consumption |

Results

TABLE 6

Feed consumption results (day 12 to day 17)

| Treatment | Diet composition | | Feed consumption (g) | | | | | |
|---|---|---|---|---|---|---|---|---|
| | | | d12-13 | d13-14 | d14-15 | d15-16 | d16-17 | d12-17 |
| A | Adequate in calcium and P level | MEAN | 321 | 241 | 273 | 319 | 349 | 1503 |
| | | SD | 90 | 37 | 84 | 116 | 51 | 221 |
| B | Low in calcium and adequate in P level | MEAN | 375 | 277 | 273 | 393 | 380 | 1697 |
| | | SD | 60 | 14 | 111 | 127 | 26 | 89 |
| | | Test F B/A | 0.305 | 0.019 | 0.484 | 0.816 | 0.101 | 0.028 |
| | | Test T B/A | 0.179 | 0.023 | 0.994 | 0.250 | 0.149 | 0.036 |

Figure 2:
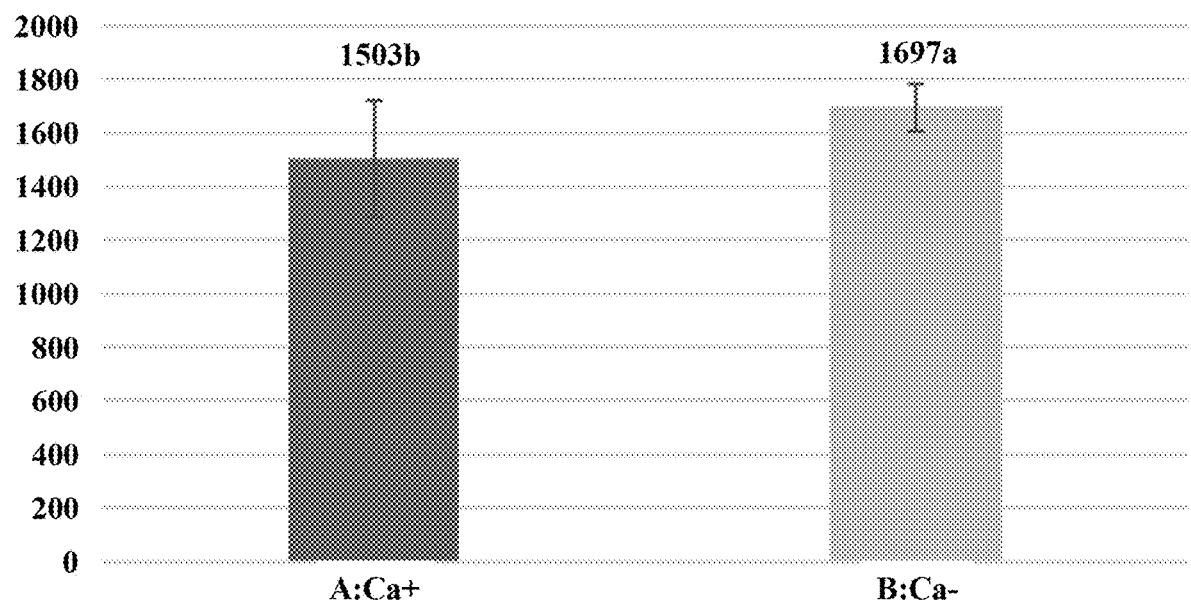
FIG. 2 depicts a comparison of total feed intake of birds based on calcium level in diet compositions as described in Example 1 below.

As can be seen from Table 6 and FIG. 2, birds fed diet with adequate calcium level fed significantly less feed than birds fed diet with low calcium level by around 11%.

Water Consumption Results (Day 12 to Day 17)

TABLE 7

Effect of diet composition on water intake supplemented with calcium

| | Diet composition | Water composition | | Water consumption (g) | | | | | |
|---|---|---|---|---|---|---|---|---|---|
| | | | | d12-13 | d13-14 | d14-15 | d15-16 | d16-17 | d12-17 |
| A | Adequate in calcium and P level | +Ca | MEAN | 392 | 317 | 424 | 471 | 493 | 2097 |
| | | | SD | 207 | 107 | 154 | 256 | 299 | 996 |
| B | Low in calcium and adequate in P level | +Ca | MEAN | 682 | 361 | 418 | 518 | 515 | 2494 |
| | | | SD | 642 | 216 | 202 | 190 | 263 | 941 |
| | | | Test F B/A | 0.008 | 0.084 | 0.490 | 0.449 | 0.740 | 0.886 |
| | | | Test T B/A | 0.244 | 0.613 | 0.949 | 0.682 | 0.879 | 0.426 |

As can be seen from Table 7, birds fed a diet with low calcium level drank more water (+19%) supplemented with calcium than birds fed a diet with an adequate calcium level.

TABLE 8

Effect of diet composition on water intake without ca supplementation

| | Diet composition | Water composition | | Water consumption (g) | | | | | |
|---|---|---|---|---|---|---|---|---|---|
| | | | | d12-13 | d13-14 | d14-15 | d15-16 | d16-17 | d12-17 |
| A | Adequate in calcium and P level | −Ca | MEAN | 444 | 367 | 453 | 511 | 523 | 2298 |
| | | | SD | 258 | 191 | 200 | 298 | 334 | 1002 |
| B | Low in calcium and adequate in P level | −Ca | MEAN | 467 | 406 | 503 | 562 | 582 | 2519 |
| | | | SD | 203 | 94 | 213 | 374 | 396 | 1207 |
| | | | Test F B/A | 0.540 | 0.081 | 0.871 | 0.567 | 0.666 | 0.636 |
| | | | Test T B/A | 0.846 | 0.614 | 0.638 | 0.770 | 0.752 | 0.696 |

As can be seen from Table 8, birds fed a diet with low calcium level drank more water than birds fed diet with an adequate level of calcium (+9.6%).

TABLE 9

Water consumption of birds fed diet with adequate calcium level

| Diet composition | Water composition | | Water consumption (g) | | | | | |
|---|---|---|---|---|---|---|---|---|
| | | | d12-13 | d13-14 | d14-15 | d15-16 | d16-17 | d12-17 |
| A Adequate in calcium and P level | +Ca | | 392 | 317 | 424 | 471 | 493 | 2097 |
| A Adequate in calcium and P level | −Ca | | 444 | 367 | 453 | 511 | 523 | 2298 |
| | | Test F A +Ca/A −Ca | 0.578 | 0.148 | 0.507 | 0.695 | 0.779 | 0.986 |
| | | Test T A +Ca/A −Ca | 0.662 | 0.530 | 0.749 | 0.774 | 0.856 | 0.693 |

As can be seen from Table 9, birds fed diet with adequate calcium level consumed more water without calcium by 9.6% than water with calcium.

TABLE 10

Water consumption of birds fed diet with low calcium level

| Diet composition | Water composition | | Water consumption (g) | | | | | |
|---|---|---|---|---|---|---|---|---|
| | | | d12-13 | d13-14 | d14-15 | d15-16 | d16-17 | d12-17 |
| B Low in calcium and adequate in P level | +Ca | | 682 | 361 | 418 | 518 | 515 | 2494 |
| B Low in calcium and adequate in P level | −Ca | | 467 | 406 | 503 | 562 | 582 | 2519 |
| | | Test F B +Ca/B −Ca | 0.007 | 0.044 | 0.893 | 0.094 | 0.302 | 0.527 |
| | | Test T B +Ca/B −Ca | 0.382 | 0.599 | 0.429 | 0.771 | 0.699 | 0.963 |

As can be seen from Table 10, birds fed diet with low calcium level consumed more water without calcium by 1% than water with calcium.

As can be seen from Feed Consumption Results Table 6, birds fed diet with adequate calcium level fed significantly less feed than birds fed diet with low calcium level by around 11%.

As can be seen from Water Consumption Results Table 7, Birds fed a diet with low calcium level drank more water (+19%) supplemented with calcium than birds fed a diet with adequate calcium level. As can be seen from Tables 8-10, birds fed a diet with adequate Ca level have a tendency to reduce water intake with calcium, while birds fed diet with low calcium level showed a higher consumption of water supplemented with calcium than birds fed a diet with adequate Ca level.

Thus, the Experiment and Tables 7-10 above demonstrate birds fed diet with low calcium level drank more water supplemented with calcium in order to compensate for the lack of calcium which is important for the growing of the animals, for example, to have the adequate ratio between calcium and phosphorus for bone mineralization.

The invention claimed is:

1. A method of providing dietary calcium to a monogastric livestock animal, the method comprising
providing to the animal a water source supplemented with calcium ions in an aqueous drinking composition having a concentration of a water-soluble organic calcium salt dissolved therein, wherein the concentration is sufficient to provide the animal at least 25% of the animal's daily dietary calcium requirement of around 1-2 g/kg to 7-40 g/kg solely from drinking the aqueous drinking composition, wherein the calcium ion supplemented water source is at a concentration sufficient to provide the animal with an amount of calcium at least equal to the difference between a total daily amount of calcium recommended for the animal and an amount of calcium consumed by the animal via a feed; and wherein the aqueous drinking composition provides at least an average daily concentration of calcium ion determined by the formula selected from:

$$[Ca2+]avg = \frac{\sum (Conc.i * Vol.i)}{Total\ Vol.}$$

the calcium ion concentration of the aqueous drinking composition at each watering, "Vol. i" is the volume of aqueous drinking composition consumed by the animal at each watering, "Σ(Conc.i*Vol.i)" is the sum of consumed calcium from multiple i waterings of the aqueous drinking composition and "Total Vol." is the total volume of aqueous drinking composition consumed by the animal over the course of a day.

2. The method of claim 1, wherein the organic calcium salt is selected from the group consisting of calcium malate, calcium acetate, calcium carbonate calcium fumarate, calcium gluconate, and combinations thereof.

3. The method of claim 1, wherein the aqueous drinking composition is provided to the animal separate from animal feed.

4. The method of claim 1, wherein the animal is selected from the group consisting of poultry, pig, sheep, goat, and cow.

5. The method of claim 1, wherein Total Vol. is less than recommended daily water consumption ad libitum for the animal, and wherein remainder of daily water consumption consumed by the animal is drinking water that lacks calcium supplementation.

6. The method of claim 1, wherein Total Vol. is equal to recommended daily water consumption ad libitum for the animal.

7. The method of claim 1, wherein the aqueous drinking composition is provided to the animal throughout a day.

8. The method of claim 1, wherein drinking water without calcium supplementation is provided at some waterings throughout a day and the aqueous drinking composition is provided at a remainder of waterings throughout the day.

9. A method of feeding and watering a monogastric livestock animal, the method comprising:
providing a feed to the animal and an optional solid calcium source, wherein a daily amount of calcium consumed by the animal via the feed and the optional solid calcium source is less than a total daily amount of calcium recommended for the animal; and
providing to the animal a water source supplemented with calcium ions in an aqueous drinking composition having a concentration of a water-soluble organic calcium salt dissolved therein, wherein the concentration is sufficient to provide the animal with at least 25% of the animal's daily dietary calcium requirement of around 1-2 g/kg to 7-40 g/kg solely from drinking the aqueous drinking composition, wherein the calcium ion supplemented water source is at a concentration sufficient to provide the animal with an amount of calcium at least equal to the difference between a total daily amount of calcium recommended for the animal and an amount of calcium consumed by the animal via the feed and the optional solid calcium source; and wherein the aqueous drinking composition provides at least an average daily concentration of calcium ion determined by the formula selected from:

$$[Ca2+]avg = \frac{\sum (Conc.i * Vol.i)}{Total\ Vol.}$$

wherein "Conc. i" is the calcium ion concentration of the aqueous drinking composition at each watering, "Vol. i" is the volume of aqueous drinking composition consumed by the animal at each watering, "Σ(Conc. I*Vol. i)" is the sum of consumed calcium from multiple i waterings of the aqueous drinking composition and "Total Vol." is the total volume of aqueous drinking composition consumed by the animal over the course of a day.

10. The method of claim 9, wherein:
a combination of the feed and the optional calcium source provides 75% or less of a total daily amount of calcium recommended for the animal,
the water source provides at least 25% of a total daily amount of calcium recommended for the animal, and
a sum of calcium consumed by the animal from the feed, the optional calcium source, and the water source is equal to at least 100% of the total daily amount of calcium recommended for the animal.

11. The method of claim 9, wherein:
a combination of the feed and the optional calcium source provides 50% or less of a total daily amount of calcium recommended for the animal,
the water source provides at least 50% of a total daily amount of calcium recommended for the animal, and
a sum of the calcium consumed by the animal from the feed, the optional calcium source, and the water source is equal to at least 100% of a total daily amount of calcium recommended for the animal.

12. The method of claim 11, wherein:
a combination of the feed and the optional calcium source provides 25% or less of a total daily amount of calcium recommended for the animal,
the water source provides at least 75% of a total daily amount of calcium recommended for the animal, and
a sum of the calcium consumed by the animal from the feed, the optional calcium source, and the water source is equal to at least 100% of a total daily amount of calcium recommended for the animal.

13. The method of claim 9, wherein:
a combination of the feed and the optional calcium source provides 15% or less of a total daily amount of calcium recommended for the animal,
the water source provides at least 85% of a total daily amount of calcium recommended for the animal, and
a sum of the calcium consumed by the animal from the feed, the optional calcium source, and the water source is equal to at least 100% of a total daily amount of calcium recommended for the animal.

14. The method of claim 9, wherein:
a combination of the feed and the optional calcium source provides 10% or less of a total daily amount of calcium recommended for the animal,
the water source provides at least 90% of a total daily amount of calcium recommended for the animal, and
a sum of the calcium consumed by the animal from the feed, the optional calcium source, and the water source is equal to at least 100% of a total daily amount of calcium recommended for the animal.

15. The method of claim 9, wherein the water-soluble organic calcium salt is selected from the group consisting of calcium malate, calcium acetate, calcium carbonate, calcium fumarate, calcium gluconate, and combinations thereof.

16. The method of claim 9, wherein the water source is provided to the animal separate from the feed and the optional solid calcium source.

17. The method of claim 9, wherein the animal is selected from the group consisting of poultry, pigs, sheep, goat, and cows.

18. The method of claim 1, wherein the aqueous drinking composition is provided to the animal proximate to but separate spatially and/or temporally from an animal feed, which does not contain an added external calcium source.

19. The method of claim 9, wherein the optional solid calcium source is not provided.

20. The method of claim 1, wherein the animal is chicken.

21. The method of claim 9, wherein the animal is chicken.

22. The method of claim 1, wherein the organic calcium salt is calcium fumarate or calcium malate.

23. The method of claim 9, wherein the organic calcium salt is calcium fumarate or calcium malate.

24. The method of claim 1, wherein the organic calcium salt is calcium fumarate anhydrous.

25. The method of claim 9, wherein the organic calcium salt is calcium fumarate anhydrous.

* * * * *